United States Patent [19]

Sobel

[11] 3,784,182

[45] Jan. 8, 1974

[54] DEFORMABLE SHOCK ABSORBING GUARD

[75] Inventor: Leonard H. Sobel, Rockaway Park, N.Y.

[73] Assignee: Collision Devices, Inc., Rockaway Park, N.Y.

[22] Filed: Oct. 1, 1971

[21] Appl. No.: 185,633

Related U.S. Application Data

[63] Continuation-in-part of Ser. No. 792,737, Jan. 21, 1969.

[52] U.S. Cl. .............. 267/140, 293/52 F, 188/1 C
[51] Int. Cl. ............................................ F16f 7/02
[58] Field of Search ............... 267/140; 293/52 F; 188/1 C

[56] References Cited

UNITED STATES PATENTS

| 3,574,379 | 4/1971 | Jordan | 267/140 |
| 2,724,463 | 11/1955 | Becker | 293/DIG. 3 |

*Primary Examiner*—James B. Marbert
*Attorney*—Maxwell E. Sparrow

[57] ABSTRACT

Energy absorbing crash or collision devices for vehicles or the like to reduce shock of collision by utilizing energy absorbing components which are flexible and compressible and/or rigid and crushable, which components may used singly or in combination, which may be used with single or multiple pressure plates, to effect gradual deceleration upon collision.

19 Claims, 13 Drawing Figures

PATENTED JAN 8 1974     3,784,182

INVENTOR.
LEONARD H. SOBEL
BY
SPARROW AND SPARROW
ATTORNEYS

DEFORMABLE SHOCK ABSORBING GUARD

This application is a continuation-in-part of application Ser. No. 792,737, filed Jan. 21, 1969.

BACKGROUND OF THE INVENTION

The invention relates to deformable shock absorbing guards, for example, vehicle crash guard devices, which provide protection against personal injury and property damage during collision.

The problem, up to the present, is to provide a vehicle or the like with shock absorbing safeguards which are easier and less expensive to manufacture, install and repair after collision. Energy absorbing systems have evolved from the use of plastics and rubber bumpers which cause colliding vehicles to bounce away from one another often resulting in spinal whiplash, and highly sophisticated types, such as, energy absorbing pistons which are not efficient when struck at an angle. Furthermore, these types are expensive to manufacture and are costwise prohibitive to repair when damaged due to collision. Although present piston-type crash guards may meet present legal standards when impacted at a specific speed, say, from five to ten miles per hour, into a rigid barrier, they are often severely damaged when subjected to impacts at higher speeds for which they were not designed, this resulting in excessive damage which necessitates extensive repair costs and possible injuries to occupants.

The foregoing problems, disadvantages and objections are overcome by the present invention which employs a deformable energy absorbing system which is effective when struck at any angle, which reduces or eliminate bounce which often results in whiplash, which can be varied to accommodate weights of vehicle and speeds of collision, which can be applied to both external and/or internal parts of the vehicle affording protection to vehicle and occupants therein, and which may employ in said system single or multiple pressure plates to effectively distribute impact forces over large areas of energy absorbing elements in the system, these devices according to the present invention can be manufactured and installed, repaired or replaced at a fraction of the cost of present devices used. The system according to the present invention is light in weight and eliminates the need of heavy support members.

SUMMARY

The invention consists of such novel features, construction, arrangements, combinations of parts and improvements as may be shown and described in connection with the devices herein disclosed by way of example only and as illustrative of preferred embodiments.

The invention comprises the utilization of (a) rigid crushable cellular material capable of being substantially destroyed during an impact to absorb energy combined with flexible compressible cellular material capable of being compressed during said impact and being returned after forces of said impact have been released; (b) flexible compressible cellular material; and (c) rigid crushable cellular material; and (d) single or multiple pressure plates which may be rigid, semi-rigid, bendable or rupturable usable in conjunction with any of the foregoing cellular materials or combinations thereof.

Where the combination of rigid crushable cellular material and flexible compressible cellular material is used, the materials are selected with regard to density, cell structure and stiffness so that on impact it is intended that when the flexible material is compressed to a certain degree, its density increases to the point where its ability to withstand further compression exceeds that of the adjacent rigid crushable material, which then commences to crush. It is understood that low speed collisions will only cause compression of the flexible cellular material. In this case, as the rigid crushable material did not come into play, no permanent damage is sustained to the system.

Where flexible compressible cellular material is combined with a pressure plate which is fracturable or rupturable, more compression of the energy absorbinb material results at the location encompassed by the fracture or rupture without substantially affecting the compression of the remainder of the flexible material. Where rigid crushable cellular material is combined with a pressure plate whichis fracturable or rupturable, more compression of the energy absorbing material results at the location emcompassed by the fracture or rupture, crushing the rigid, crushable cellular material only at point of impact without crushing the remainder of the crushable cellular material. In both cases fracturable or rupturable pressure plates are to be used when vehicle design and body curvature and weights of the vehicle may make it impractical to use a rigid pressure plate.

The invention further comprises the utilization of rigid crushable cellular material having encased therein one or more elements of flexible compressible cellular material; the utilization of flexible compressible cellular material having encased therein one or more elements of rigid crushable cellular material.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawings in which:

Figure 5:
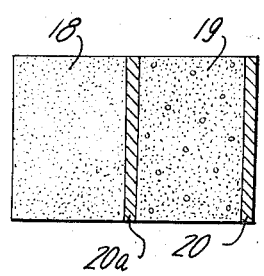
Figure 8:
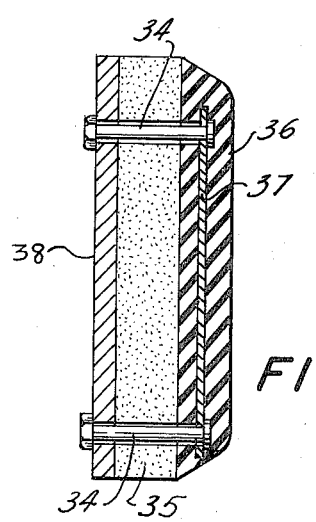
Figure 6:
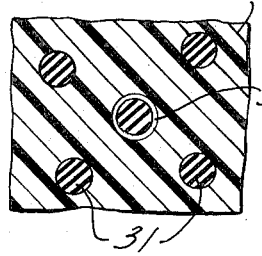
Figure 7:
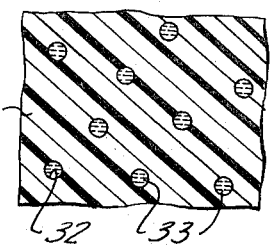

3 in impacting forces being distributed over a partial area of the compressible cellular material;

FIG. 5 is a view of a combination of compressible materials and pressure plates;

FIG. 6 represents a type of flexible compressible cellular material encasing rigid crushable cellular material;

FIG. 7 represents a type of rigid crushable cellular material encasing flexible compressible cellular material; and FIG. 8 is a view of a crash guard comprising a fracturable or bendable pressure plate embedded in a protective cover.

DESCRIPTION OF THE PREFERRED EMBODIMENTS

Figure 1A:
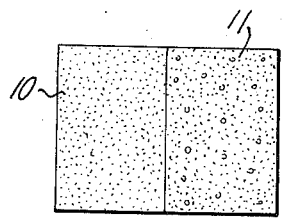
FIG. 1A is a view of a combined rigid, crushable cellular energy absorbing material and flexible compressible cellular material, in normal condition.
Figure 1B:
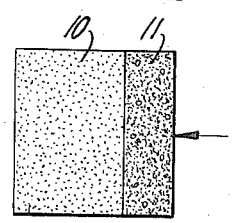
FIG. 1B is a view of FIG. 1A after an impact force has been applied showing the degree of compression of both materials.
Figure 1C:
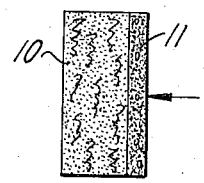
FIG. 1C is a view showing FIG. 1A after being impacted with a force greater than that which impacted 1B.

Referring to the drawings, FIGS. 1A, 1B and 1C illustrate one embodiment of the invention in which FIG. 1A discloses two cellular compressible materials 10 and 11 respectively. Material 10 comprises a rigid crushable cellular member and material 11 comprises a flexible compressible cellular member. Both materials are disposed in side by side relation in normal condition before impact.

FIG. 1B shows materials 10 and 11 in similar relation during impact. Under such condition, compressible member 13 has undergone compression, but the impact force was not great enough to bring into play the rigid crushable cellular material 10.

FIG. 1C shows the result of an impact force greater than that shown in 1B, in that flexible compressible cellular member 11 has been compressed to its limit and the remaining forces, not fully dissipated, have crushed the rigid crushable cellular member 10.

The example of energy absorbing crash guard depicted and described above, thus comprises the rigid crushable cellular material 10, and the flexible compressible cellular material 11, these materials 10, 11 being arranged as elements in a set, each with a predetermined density, stiffness and cell structure. The cell structure may be open cell, closed cell, fine or coarse grain and wall thickness between cells being fine or heavy. The construction of the component elements 10, 11, may be of the open or closed cell variety of foams or foam-like materials. When certain impact forces are applied to said set, the flexible compressible material 11 will be compressed and when the forces of impact are removed, the flexible compressible material or element 11 returns substantially to its original condition with the rigid crushable cellular material or element 10 being unchanged; and when said impact forces applied to said set are greater than the said impact forces, causing said flexible compressible element 11 to reach the limit of its compressibility (as shown in FIG. 1C) thus being incapable of further compression, the rigid crushable cellular element 10 will be acted upon by the said greater impact forces by being at least partially crushed (as shown in FIG. 1C), thereby dissipating said greater impact forces, by absorption of the excess energy which is converted into work by permanent destruction of at least a portion of the rigid crushable cellular element 10.

As illustrated generally, FIGS. 6 and 7 depict other possible means of arranging various types of elements in a set. In FIG. 6, the flexible compressible cellular material 30 encases rigid crushable cellular elements 31, which may be of any desired shape. Any of the elements 31 may be housed by a rigid, bendable or fracturable shell 31a which would serve to act as a pressure plate insuring increased load distribution on this element when impacted. In FIG. 7, the rigid crushable cellular material 34 encases flexible compressible cellular elements, 32, 33, which may be of any desired shape. Any of elements 32, 33, may be also housed by the aforementioned type shells which would assure better load distribution on these elements when impacted.

Figure 2A:
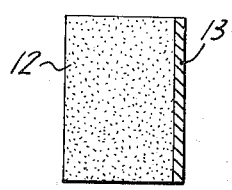
FIG. 2A is a view of compressible cellular material combined with a rigid pressure plate, in normal condition.
Figure 2B:
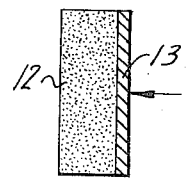
FIG. 2B is a view showing FIG. 2A under impact where pressure plate is distributing an impact force over the entire area of energy absorbing device.

FIG. 2A illustrates any suitable type compressible cellular material 12 combined with a rigid pressure plate 13 in normal condition. FIG. 2B shows how plate 13 when impacted distributes the load equally over the entire impact surface.

Figure 3A:
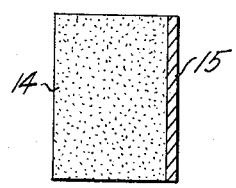
FIG. 3A is a view showing compressible cellular material combined with a bendable pressure plate, in normal condition.
Figure 3B:
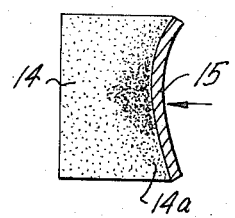
FIG. 3B is a view showing FIG. 3A under impact where pressure plate is bent at location of impact.

FIG. 3A illustrates any suitable compressible cellular material 14 combined with a bendable pressure plate 15 in normal condition. FIG. 3B illustrates the device after being impacted, in which case the force of impact is distributed unequally on the surface of the compressible material as indicated at 14a, the major load being in the central portion and the minor load distribution adjacent to the extremities.

Figure 4A:
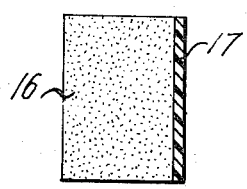
FIG. 4A is a view of compressible cellular material combined with a fracturable or rupturable pressure plate, in normal condition.
Figure 4B:
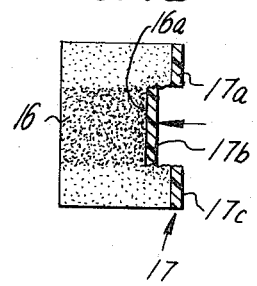
FIG. 4B is a view showing FIG. 4A under impact where the pressure plate fractures or ruptures resulting

FIG. 4A illustrates any suitable compressible cellular material 16 combined with a fracturable or rupturable pressure plate 17, in normal condition. FIG. 4B illustrates the device after being impacted, in which case, fracturable pressure plate 17 has fractured into parts 17a, 17b, 17c. It is evident that the impact force at 17b was greater than at the surrounding area and the distribution of load was confined substantially to the compressible cellular material as indicated at 16a. In the event that the compressible cellular material 16 is of the rigid crushable type, then the cells of the material adjacent to the impacted fractured portion of plate 17b would be substantially destroyed.

FIG. 5 illustrates an arrangement of flexible compressible material as an element 19 and rigid crushable cellular material as an element 18 combined with a pressure plate 20 which may be rigid, bendable or fracturable disposed adjacent the compressible cellular material 19, which plate 20 receives the impact force. A second pressure plate 20a which may be rigid, bendable or fracturable may be interposed between the compressible cellular materials 18, 19. Plate 20a, however, may be the same as plate 20, or embodying any one or more of the physical characteristics thereof, such as bendability, fracturability and rigidity. The selection of types of pressure plates or combinations thereof should be made with regard for anticipating crash speeds, vehicle weights, angles of crash, contour of vehicle body design, and energy absorbing capacity of the types or combination of types of the energy absorbing material used.

FIG. 6 illustrates a type of flexible compressible cellular material 30 encasing rigid crushable cellular material 31. The cellular material 31 may be of any shape and may be enclosed or housed in a shell 31a acting as a pressure plate when impacted, which may be rigid, bendable or fracturable, and which would facilitate distribution of impact load over larger areas of said enclosed material 31, when impacted.

FIG. 7 illustrates a type of rigid crushable cellular material 34 encasing flexible compressible cellular material 32, 33. Cellular material 32, 33, may be of any shape and may be enclosed or housed in a shell similar to shell 31a disclosed in FIG. 6.

The pressure plates referred to in FIGS. 1A through FIG. 7 may be made of any appropriate material, such as for example metal, plastic, fibrous material, etc.

FIG. 8 illustrates a crash guard comprising a pressure plate 37 embedded in a protective cover 36. Pressure plate 37 may be rigid, bendable or fracturable and may be made of any suitable material, such as, for example, materials heretofore indicated. Protective cover 36 may be made of any suitable flexible or resilient material and is disposed adjacent to energy absorbing cellular member 35. This crash guard may be secured to any suitable part 38 of a vehicle by means of bolts 36 or similar fastening devices.

It is within the scope of the present invention to include synthetic crushable foams and natural crushable material, such as, for example, lava, coral and like materials. It is obvious that the impact load requirements would dictate the selection of the proper material or combination of materials. Such factors as speed at time of collision, nature, stiffness or modulus of the colliding bodies, extent to which persons in the vehicles are restrained by safety devices, would determine the selection of the materials to be utilized as the energy absorbing member or members.

While the invention has been described and illustrated with respect to certain preferred examples, it will be understood by those skilled in the art after understanding the principle of the invention, that various changes and modifications may be made without departing from the spirit and scope of the invention.

What is claimed is:

1. Energy absorbing crash guard comprising rigid crushable cellular material, and flexible compressible cellular material, said cellular materials arranged as elements in a set with density, cell structure and stiffness of each of said elements predetermined so that when certain impact forces are applied to said set, said flexible compressible cellular material will be compressed, and when said forces are removed, said flexible, compressible cellular material returning substantially to its original condition with said rigid cellular material being unchanged; and when said impact forces applied to said set are greater than said certain impact forces causing said flexible compressible cellular material to reach the limit of its compressibility, thus being incapable of further compression, said rigid crushable cellular material will be acted upon by said greater impact forces by being at least partially crushed thereby dissipating said greater impact forces, by absorption of the excess energy which is converted into work by permanent destruction of at least a portion of said rigid crushable cellular material, and a non-rigid pressure plate contiguous to the impact surface of said flexible compressible cellular material, whereby said pressure plate acts as a means to distribute the impact load over at least a portion of said impact surface.

2. Energy absorbing crash guard according to claim 1, and a second pressure plate interposed between said flexible compressible cellular material and said rigid crushable cellular material.

3. Energy absorbing crash guard according to claim 1, said plate being bendable when impacted upon.

4. Energy absorbing crash guard according to claim 2, at least one of said pressure plates being bendable when impacted upon.

5. Energy absorbing crash guard according to claim 1, said plate being fracturable when impacted upon.

6. Energy absorbing crash guard according to claim 2, at least one of said pressure plates being fracturable when impacted upon.

7. Energy absorbing crash guard comprising compressible material, and at least two pressure plates, one of said plates being a rigid member and the other of said plates being a non-rigid member, said plates serving to distribute a load of an impact force in predetermined varying degrees upon said compressible material upon impact.

8. Energy absorbing crash guard according to claim 7, said non-rigid plate being bendable when impacted.

9. Energy absorbing crash guard according to claim 7, said non-rigid plate being fracturable when impacted.

10. Energy absorbing crash guard comprising compressible material, and at least two pressure plates, one of said plates being a bendable member and the other of said plates being a fracturable member, said plates serving to distribute a load of an impact force in predetermined varying degrees upon said compressible material upon impact.

11. Energy absorbing crash guard comprising compressible cellular material, and a pressure plate contiguous to the impact surface of said material, said plate being bendable when impacted upon by a predetermined level of impact energy, said plate transmitting impact energy to said compressible cellular material with substantial uniform pressure distribution on the area of said plate in contact with said cellular material when the impact energy exceeds said predetermined level, said cellular material absorbing the quantity of impact energy transmitted by said pressure plate above said predetermined level.

12. Energy absorbing crash guard according to claim 11, wherein said compressible cellular material is flexible.

13. Energy absorbing crash guard according to claim 11, wherein said compressible cellular material is rigid and crushable.

14. Energy absorbing crash guard comprising compressible cellular material, and a pressure plate contiguous to the impact surface of said material, said plate being fracturable when impacted upon, whereby said pressure plate acts as a means to distribute the impact load over at least a portion of said impact surface.

15. Energy absorbing crash guard according to claim 14, wherein said compressible cellular material is flexible.

16. Energy absorbing crash guard according to claim 14, wherein said compressible cellular material is rigid and crushable.

17. Energy absorbing crash guard comprising compressible material, a bendable pressure plate, said plate being encased in a substantially flexible protective covering, said covering being contiguous to the impact surface of said compressible material, whereby said pressure plate acts as a means to distribute the impact load over at least a portion of said impact surface.

18. Energy absorbing crash guard comprising compressible material, a fracturable pressure plate, said plate being encased in a substantially flexible protective covering, said covering being contiguous to the impact surface of said compressible material, whereby said pressure plate acts as a means to distribute the impact load over at least a portion of said impact surface.

19. Energy absorbing crash guard comprising compressible cellular material, and a shell-like enclosure encasing said material, whereby said enclosure acts as a means to distribute the impact load over at least a portion of the impact surface.

* * * * *